US011289870B2

(12) United States Patent
Piccoli et al.

(10) Patent No.: US 11,289,870 B2
(45) Date of Patent: Mar. 29, 2022

(54) METHOD AND SYSTEM FOR GENERATING TUNABLE ULTRAFAST OPTICAL PULSES

(71) Applicant: INSTITUT NATIONAL DE LA RECHERCHE SCIENTIFIQUE, Quebec (CA)

(72) Inventors: Riccardo Piccoli, Montreal (CA); Bruno E. Schmidt, Montreal (CA); Luca Razzari, Mont-Royal (CA); Younggyun Jeong, Montreal (CA); Roberto Morandotti, Montreal (CA)

(73) Assignee: INSTITUT NATIONAL DE LA RECHERCHE SCIENTIFIQUE

( * ) Notice: Subject to any disclaimer, the term of this patent is extended or adjusted under 35 U.S.C. 154(b) by 114 days.

(21) Appl. No.: 16/784,552

(22) Filed: Feb. 7, 2020

(65) Prior Publication Data
US 2020/0259305 A1    Aug. 13, 2020

Related U.S. Application Data

(60) Provisional application No. 62/802,415, filed on Feb. 7, 2019.

(51) Int. Cl.
*H01S 3/00* (2006.01)
*G02F 1/35* (2006.01)
(Continued)

(52) U.S. Cl.
CPC .......... *H01S 3/0092* (2013.01); *G02F 1/3503* (2021.01); *G02F 1/353* (2013.01);
(Continued)

(58) Field of Classification Search
CPC ...... G02F 1/3503; G02F 1/3507; G02F 1/353; G02F 1/3551; G02F 1/365; H01S 3/0078;
(Continued)

(56) References Cited

U.S. PATENT DOCUMENTS

| 7,076,174 B2 * | 7/2006 | Watanabe | H04B 10/299 385/1 |
| 7,339,721 B1 * | 3/2008 | Berkey | G02F 1/365 359/329 |

(Continued)

FOREIGN PATENT DOCUMENTS

WO    WO-2017021591 A1 *  2/2017  ......... H01S 3/06754

OTHER PUBLICATIONS

Weiner, Andew M., "Ultrafast Optics", A John Wiley & Sons, Inc., Publication, Purdue University,Table of Contents (2009).
(Continued)

*Primary Examiner* — Daniel Petkovsek
(74) *Attorney, Agent, or Firm* — Lavery, De Billy, LLP; Gwendoline Bruneau (57) ABSTRACT

A system and a method for generating tunable ultrafast optical pulses, the method comprising spectral broadening of a laser input beam by propagating the laser input beam in a nonlinear medium of a third-order nonlinear susceptibility $\chi^{(3)}$, yielding an output laser spectrum; and one of: i) selecting at least one portion of the output laser spectrum, yielding an output pulse different than the input pulse and centered at a different frequency; ii) temporal compensation and spatial spreading of spectral components of the output laser spectrum; selecting two pulses at two different frequencies; and nonlinearly mixing the two pulses together in a first second-order nonlinear susceptibility $\chi^{(2)}$ nonlinear crystal into a third pulse centered at a frequency which is a difference between the frequencies of the first two pulses; and iii) dividing output laser spectrum into a pump beam and a probe beam, directing a pump pulse to a third second-order nonlinear crystal for THz radiation generation; and directing a probe pulse to a third second-order nonlinear crystal for THz radiation reconstruction.

10 Claims, 9 Drawing Sheets

(51) Int. Cl.
*H01S 3/03* (2006.01)
*H01S 3/30* (2006.01)
*G02B 27/14* (2006.01)
*G02F 1/355* (2006.01)
*G02F 1/365* (2006.01)

(52) U.S. Cl.
CPC .......... *G02F 1/3507* (2021.01); *H01S 3/0057* (2013.01); *H01S 3/0315* (2013.01); *G02B 27/14* (2013.01); *G02F 1/3551* (2013.01); *G02F 1/365* (2013.01); *H01S 3/305* (2013.01)

(58) Field of Classification Search
CPC ...... H01S 3/0092; H01S 3/0315; H01S 3/305; G02B 27/14
See application file for complete search history.

(56) References Cited

U.S. PATENT DOCUMENTS

| | | | |
|---|---|---|---|
| 7,848,647 B2 * | 12/2010 | Watanabe | H04B 10/07953 398/45 |
| 7,982,943 B2 * | 7/2011 | Okuno | G02F 1/3513 359/327 |
| 8,478,134 B2 * | 7/2013 | Nicholson | H01S 3/0057 398/194 |
| 8,482,847 B2 * | 7/2013 | Kuo | G01J 3/12 359/330 |
| 8,861,555 B2 * | 10/2014 | Fermann | G02B 6/02038 372/4 |
| 9,160,137 B1 | 10/2015 | Abdolvand et al. | |

OTHER PUBLICATIONS

Pouysegur, J., et al., "Generation of 150-fs pulses from a diode-pumped Yb: KYW nonlinear regenerative amplifier", Optics Express, pp. 1-6 (2014).
Clerici, M., et al., "Wavelength Scaling of Terahertz Generatin by Gas Ionization", Physic Review Letters 110, 253901 (2013).
Vicario, C., et al., "Intense, carrier frequency and bandwith tunable quasi single-cycle pulses from an organic emitter covering the Terahertz frequency gap", Scientific Reports, pp. 2-8 (2015).
Corkum, P.B., et al., Attosecond Science, Progress Article, Nature Publishing Group, vol. 3, pp. 381-387 (2007).
Pullen, et al., "Imaging an aligned polyatomic molecule with laser-induced electron diffraction", Nature Communications, pp. 1-6 (2015).
Zewail, A. H., "Femtochemistry: Atomic-Scale Dynamics of the Chemical Bond", J. Phys. Chem., 200, 104, pp. 5660-5694 (2000).
Ackermann, R. et al, "Femtosecond laser treatment of the crystalline lens: a 1-year study of possible cataractogenesis in minipigs", Graefes Arch Clin Exp Ophthalmol 249:1567-1573 (2011).
Sugioka, K., et al., "Ultrafast lasers-reliable tools for advanced materials processing", Light:Science & Applications, vol. 3, pp. 1-12 (2014).
Manzoni, C., et al., "Design criteria for ultrafast optical parametric amplifiers", IOP Publishing, Journal of Optics 18:103501, pp. 2-34 (2016).
Ciriolo, A.G., et al., "Optical Parametric Amplification Techniques for the Generation of High-Energy Few-Optical-Cycles IR Pulses for Strong Field Applications", Applied Sciences 7:265, pp. 1-28 (2017).
Brida, D., et al., "Few-Optical-cycle pulses tunable from the visible to the mid-infrared by optical parametric amplifiers", IOP Publishing, Journal of Optics 12:013001, pp. 1-14 (2010).
Takahashi, E.J., et al., "10mJ class femtosecond optical parametric amplifier for generating soft x-ray harmonics", Applied Physics Letters 93, 041111 (2008).
Thire, N., et al., "10 mJ 5-cycle pulses at 1.8 urn through optical parametric amplification", Applied Physics Letter 106, O91110 (2015).
Dubietis, A., et al., "Powerful femtosecond pulse generation by chirped and stretched pulse parametric amplification in BBO crystal", Optics Communication 88:437-440 (1992).
Vozzi, C., et al., "Millijoule-level phase-stabilized few-optical-cycle infrared parametric source", Optics Letters, vol. 32, No. 20, pp. 2957-2959 (2007).
Ishii, N., et al., "Sub-two-cycle, carrier-envelope phase-table, intense optic pulse at 1.6 urn from a BiB306 optical parametric chirped-pulse amplifier", Optics Letters, vol. 37, No. 20, pp. 4182-4184 (2012).
Fu, Y., et al., "High-energy infrared femtosecond pulses generated by dual-chirped optical parametric amplification", Optics Letters, vol. 40, No. 21, p. 5082-5085 (2015).
Schmidt, B. E., et al., "Frequency domain optical parametric amplification", Nature Communications, pp. 1-8 (2014).
Nisoli, M., et al., "Generation of high energy 10 fs pulses by a new pulse compression technique", Applied Physics Letters 68, 2793 (1996).
Jeong, Y-G, et al., "Direct compression of 170-fs 50-cycle pulses down to 1.5 cycles with 70% transmission", Scientific Reports, pp. 1-6 (2018).
Gruson, V., al., "2.5. TW, two-cycle IR laser pulses via frequency domain optical parametric amplification", Optics Letters, vol. 25, No. 22, Optics Letters, pp. 1-9 (2017).
Agrawal, G.P., "Nonlinear Fiber Optics", Third Edition, Optics and Photonics, The Institute of Optics, University of Rochester, Table of Contents (2001).

* cited by examiner

METHOD AND SYSTEM FOR GENERATING TUNABLE ULTRAFAST OPTICAL PULSES

CROSS REFERENCE TO RELATED APPLICATIONS

This application claims benefit of U.S. provisional application Ser. No. 62/802,415, filed on Feb. 7, 2019. All documents above are incorporated herein in their entirety by reference.

FIELD OF THE INVENTION

The present invention relates to ultrafast optical pulses generation. More specifically, the present invention is concerned with a method and a system for generating tunable ultrafast optical pulses.

BACKGROUND OF THE INVENTION

Nowadays, a range of fundamental investigations and industrial applications are enabled using optical pulses with ultrashort durations, typically of less than 100 fs, high-peak powers and broad bandwidths [1]. Common laser media, such as Ti:sapphire, Yb-doped, Nd-doped and Er-doped gain media, may generate such ultrashort pulses at specific fixed wavelengths: 800 nm, 1030 nm, 1064 nm, and 1500 nm, respectively. A main limitation of such sources lies in the fact that they feature a limited gain bandwidth, which does not allow wavelength tuning over a broad spectral range. For example, the emerging technology of amplified Yb-doped laser systems can only emit fairly long pulses of about 150 fs centered around 1030 nm without any tuning possibility, due to the limited gain bandwidth and gain narrowing effect [2].

Many applications such as ultra-broadband [3] and high-field [4] terahertz (THz) generation, attosecond pulse isolation via high-harmonic generation [5], laser-induced electron diffraction [6], time-resolved pump-probe spectroscopy [7], biomedical applications [8], and industrial micromachining [9], require the generation of high-energy ultrashort laser pulses at wavelengths different from the ones emitted by the above-mentioned laser gain media to perform best.

Since no laser material can directly provide optical gain over a broad frequency range spanning from the infrared to the UV region, a solution is to use nonlinear optical effects to convert the frequency of the light, to achieve some degree of frequency tunability. However, generating high-energy ultrashort pulses widely-tunable in the UV and near-infrared regions still represents a major challenge in optics.

A common approach relies on the use of optical parametric amplification (OPA) in non-centrosymmetric materials ($\chi^{(2)}$ second-order nonlinear media) for frequency down-conversion [10, 11]. From the quantum physics point of view, one pump photon of frequency $v_1$ is annihilated in the nonlinear medium and two photons, referred to as signal $v_2$ and idler $v_3$, at lower frequencies or, equivalently, longer wavelengths, are generated according to the energy conservation principle: $v_1=v_2+v_3$. In addition to energy conservation, also momentum conservation, or phase-matching condition, must be satisfied: $\Delta k=k_1-k_2-k_3=0$, $k_i=2\pi \cdot v_i \cdot n_i/c$, $n_i$ and c being the refractive index of the medium at the frequency $v_i$ and the speed of the light, respectively. In this nonlinear process, the energy of a high-intensity pump pulse of frequency $v_1$ is transferred to a lower frequency and lower intensity signal, or equivalently idler, pulse of frequency $v_2$, which results amplified. Therefore, the optical parametric amplification (OPA) provides optical gain without energy storage in the medium, in contrast to laser media, over a broad range of frequencies, yet constrained by the energy and momentum conservation laws. For instance, a typical optical parametric amplification (OPA) system pumped by a Ti:sapphire laser emitting at 800 nm can achieve continuous frequency tuning in the near-infrared region between 1.15-1.6 µm for the signal and between 1.6-3.0 µm for the idler pulse. Nowadays, common optical parametric amplification (OPA) systems can deliver sub-millijoule (mJ) few-cycle pulses [12] or ten-mJ level multi-cycle pulses [13,14] with energy conversion efficiencies on the order of 15%. Especially in the few-cycle regime, temporal match is required to attain efficient energy transfer between the pump pulse and the signal one, whereby the pump pulse duration should match the duration of the signal one.

To overcome the restriction of the temporal match between pump and signal pulses, which imposes the use of high-intensity femtosecond pump laser sources, optical parametric chirped-pulse amplification (OPCPA) has been introduced in 1992 [15]. In this approach, a femtosecond low-power laser is used to generate the signal pulse, which is the seed to be amplified, while a picosecond high-power laser, typically a commonly available Q-Switching laser source, is employed as a pump source. To ensure the temporal overlap between the two pulses, corresponding to efficient energy transfer, the signal pulse is firstly stretched in time to the picosecond regime, amplified and finally recompressed to its transform-limited duration. Optical parametric chirped-pulse amplification (OPCPA) systems provide the possibility of amplifying very broad, i.e., ultrashort, pulse to high energy level inaccessible to optical parametric amplification (OPA) systems. High-power amplification of mJ level, sub-three-cycle pulses was therefore demonstrated [16,17]. Nevertheless, satisfying the phase-matching condition over an optical octave, along with the crystal damage thresholds still set fundamental limitations in optical parametric chirped-pulse amplification (OPCPA) systems.

A slightly different approach to generate high-energy infrared femtosecond pulses, referred to as dual-chirped optical parametric amplification parametric amplification (DC-OPA), is based on stretching in time both pump and signal pulses [18], allowing generation of 20 mJ 27 fs at 1.4 µm (signal) and 13 mJ at 1.9 µm (idler) with 30-40% energy conversion efficiency from pump to signal+idler.

Another alternative method relies on the amplification of the corresponding spectral parts of a signal pulse independently in a frequency domain optical parametric amplifier (FOPA) [19]. The main advantage of this method is the simultaneous upscaling of pulse energy and amplified bandwidth. In this way, it was possible to achieve 30 mJ, two-cycle pulses at 1.8 µm [20].

Beside the above examples of different methods for generation of pulses at a frequency different from the laser one, there is a variety of possible realizations of optical parametric amplification (OPA) systems that can be found in literature (Refs. [10-12]).

Regardless of the method employed, be it optical parametric amplification (OPA), optical parametric chirped-pulse amplification (OPCPA), dual-chirped optical parametric amplification (DC-OPA), frequency domain optical parametric amplifier (FOPA), these systems typically comprise multiple stages, are bulky, expensive, may feature imperfect beam quality, and deliver pulse durations comparable to the ones of the pumping, or seeding, laser system. The tuning range is mainly limited by the phase-matching condition as well as the transparency of the nonlinear crystal employed, especially in the ultraviolet (UV) region and mid-infrared region, typically beyond 3 µm. Phase-matching condition does not only limit the gain bandwidth of the optical parametric amplification (OPA) but also sets a lower limit to the tuning range. For example, pumping at 0.8 µm, the signal can be typically tuned from 1.15 µm to 1.6 µm, while the idler is tuned from 1.6 µm to 3 µm. Therefore, there is a "gap" in the spectrum between 0.8 µm and 1.1 µm that cannot be directly filled.

To overcome this gap, it is necessary to pump the optical parametric amplification (OPA) system at a shorter wavelength, such as at 0.4 µm by doubling in frequency v1a second harmonic generation (SHG), which divides the pump wavelength by two. In this way, the amplified signal can be tuned from 0.45 µm to 0.8 µm while the idler extends from 0.8 µm to 2.5 µm. This approach allows to cover the visible part of the spectrum, but unfortunately leads to lower pump energy available since another nonlinear process, such as second harmonic generation (SHG), must be used to double the pump frequency. Thus, the overall efficiency drops down below 10%.

This issue becomes even more serious if ultrashort laser pulses in the UV spectral range (0.25 µm-0.35 µm) are of interest. Indeed, following the previous strategy, the pump laser frequency should be quadruple. This process is even more inefficient and, moreover, it is not easy to find a suitable nonlinear medium transparent at those wavelengths. On top of the above-mentioned constrains, in optical parametric amplification (OPA) systems the pump pulse duration is a crucial issue since it must be matched to the duration of the seed pulse to be amplified. Therefore, if ultrashort pulses are required, this imposes the use of expensive and sophisticated laser systems to generate high-energy few-cycle pump pulses. Moreover, the ultrashort seed pulse at a specific wavelength is typically not available since no gain media exist at those wavelengths. Therefore, it must be "artificially" generated via another nonlinear process, typically white-light generation in a sapphire crystal, thus further reducing the overall efficiency of the system. Furthermore, synchronization, electronically or optically, between the interacting pulses is required in both optical parametric amplification (OPA) and optical parametric chirped-pulse amplification (OPCPA) systems, which also contributes to increase the system complexity. Another crucial characteristic in the few-cycle regime is the carrier-envelope phase (CEP), the phase offset between carrier and the envelope of the pulse. This requires an accurate stabilization since changes in carrier-envelope phase (CEP) strongly affect the shape of the output pulse waveforms. Even though nowadays optical parametric amplification (OPA) systems can cover a wide range of frequencies from the UV to the mid-infrared, this is achieved at the expense of an increase of system complexity and costs, both at the optical parametric amplification (OPA) and the pumping laser system level.

Therefore, cost-effective solutions delivering ultrashort pulses and that are tunable in a wide range of frequencies, starting from common and relatively inexpensive laser sources, still represents a significant technological challenge.

There is still a need in the art for a method and a system for generating tunable ultrafast optical pulses.

The present description refers to a number of documents, the content of which is herein incorporated by reference in their entirety.

SUMMARY OF THE INVENTION

More specifically, in accordance with the present invention, there is provided a system for generating tunable ultrafast optical pulses, comprising a laser source, a nonlinear medium of a third-order nonlinear susceptibility $\chi^{(3)}$, and a filter unit, wherein a beam from the laser source is directed for propagation within the nonlinear medium, and the filter unit selects at least one portion of a pulse output spectrum.

There is further provided a method comprising spectral broadening of a laser input beam by propagating the laser input beam in a nonlinear medium of a third-order nonlinear susceptibility $\chi^{(3)}$, yielding an output laser spectrum; and one of: i) selecting at least one portion of the output laser spectrum, yielding an output pulse different than the input pulse and centered at a different frequency; ii) temporal compensation and spatial spreading of spectral components of the output laser spectrum; selecting two pulses at two different frequencies; and nonlinearly mixing the two pulses together in a first second-order nonlinear susceptibility $\chi^{(2)}$ nonlinear crystal into a third pulse centered at a frequency which is a difference between the frequencies of the first two pulses; and iii) dividing output laser spectrum into a pump beam and a probe beam, directing a pump pulse to a third second-order nonlinear crystal for THz radiation generation; and directing a probe pulse to a third second-order nonlinear crystal for THz radiation reconstruction.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1A:
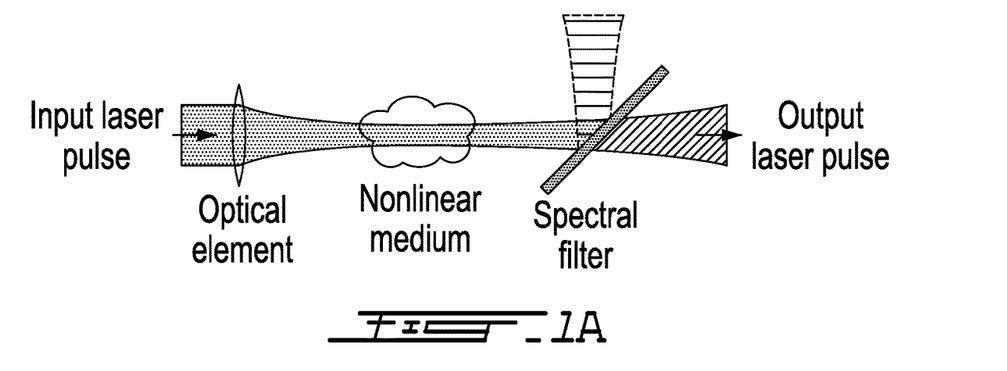
FIG. 1A shows a schematic of a method according to an embodiment of aspects of the present disclosure.
Figure 1B:
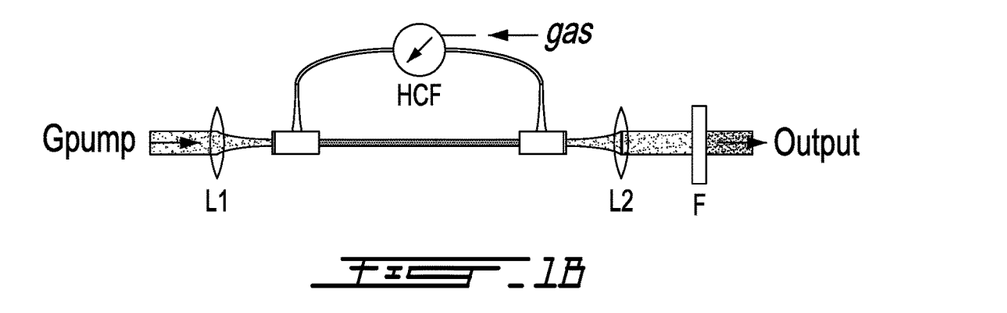
FIG. 1B shows a schematic of a system according to an embodiment of aspects of the present disclosure.

In a nutshell, a method according to an aspect of the present disclosure comprises spectrally broadening a input laser pulse by propagation into a nonlinear medium, and filtering a portion of the pulse laser output spectrum. A system according to an aspect of the present disclosure comprises a laser source, an optical unit adjusting the size of the input laser pulse from the laser source to a matching optical intensity in a propagation-free nonlinear medium and/or to a matching main mode of a nonlinear medium waveguide, and a spectral filter unit selecting, either in transmission or in reflection, at least one portion of the pulse laser output spectrum (FIG. 1).

The laser source is selected to generate optical input laser pulses of a pulse energy of at least 1 nJ and pulse duration of at most 1 ns.

The laser beam may be directed into the nonlinear medium once (single pass), twice or a plurality of times (multi-pass).

The nonlinear medium may be configured for a free propagation or as a waveguide.

An optical unit directs the beam into the nonlinear medium. The optical unit is selected with a positive or negative focal length comprised between about 1 mm and about 1 m. The optical unit may comprise single lenses, lenses in a telescope configuration, or alternatively a single focusing mirror or a focusing a defocusing mirror in a telescope configuration, or tapered and lensed fibers, for example.

A nonlinear medium as a waveguide may have internal core diameters in a range between about 500 nm and about 5 mm. The waveguide may guide the laser pulse over an adjustable propagation distance, thus enhancing and tailoring the interaction with the nonlinear medium. The waveguide may comprise at least one of: hollow-core-fibers (HCF), photonics crystal fibers, structured fibers, optical fibers, or integrated optical waveguides.

The nonlinear medium is selected with a with third-order nonlinear susceptibility $\chi^{(3)}$ larger than $10^{27}$ m$^2$/V$^2$. The nonlinear medium determines the type of spectral broadening of the propagating pulse. The nonlinear medium may a gas, such as Argon, Helium, Krypton, Xenon, and carbon dioxide for example, or a liquid, such as $CS_2$, a solid-state material, such as silica, YAG, sapphire, or plasmas for example. Selecting a molecular Raman-active gas, such as Nitrogen for example, allows producing an asymmetric broadening towards longer wavelengths.

The spectral filter unit subsequent to the nonlinear medium may be one of: long-pass edge filters, short-pass edge filters and band-pass filters, of an edge selected to be steep enough to select a specific portion or a lobe of the output laser spectrum. The filter unit is selected with negligible chromatic dispersion in the operating band. The filter unit may comprise dielectric filters and/or colored glass filters. The filter unit may comprise diffraction gratings or prisms, grisms, Fabry-Perot interferometers, or optical resonators.

Figure 1C:
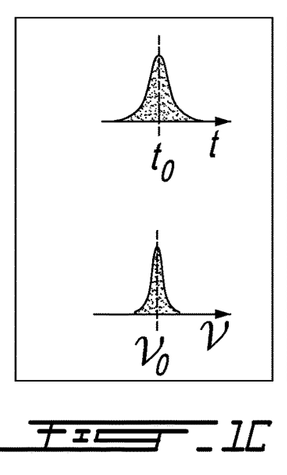
FIG. 1C, FIG. 1D and FIG. 1E show operation of the method and system of FIGS. 1A-B according to an embodiment of aspects of the present disclosure.
Figure 1D:
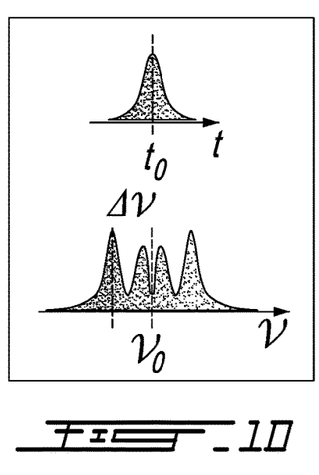

In an embodiment illustrated in FIG. 1B, the input laser pulse is a Gaussian pump pulse (Gpump, FIG. 1C). The input laser pulse is focused by a first optical element (L1) into a gas-filled hollow-core-fiber (HCF). The input laser pulse (Gpump) spectrum is broadened during propagation along the gas-filled hollow-core-fiber (HCF) while its duration remains the same (FIG. 1D-lower panel). The broadened pulse is then collimated by a second optical element (L2) and an external lobe (FIG. 1E) of the spectrum, such as for example in this case the left handside portion of the spectrum in FIG. 1D-lower panel, is selected, using a filter (F) with transmission T (FIG. 1E), yielding an output signal (Output).

The input laser pulse is selected as a Gaussian transform-limited laser pulse, i.e. an optical pulse whose time-bandwidth product is minimum, for simplicity. A range of pulses, with temporal shape different from a Gaussian and also non-transform-limited, may be used.

Along propagation in the gas-filled hollow-core-fiber (HCF), assuming negligible chromatic dispersion of the gas, the input laser pulse spectrum is broadened and new frequencies, i.e. new colors, are generated around the central frequency $v_0$. These frequencies result also dispersed in time, but the pulse duration remains mainly unaltered (see FIG. 1D). Such self-phase modulation (SPM) is related to the instantaneous electronic response of the third-order nonlinearity $\chi^{(3)}$ of the gas, typically a noble gas such as Argon, Helium, Xenon, and Krypton [21-23]. This is a third-order nonlinear process, in contrast to the second-order nonlinear process implemented in the optical parametric amplification (OPA) systems for example.

Asymmetric broadening of the input pulse spectrum across the central frequency $v_0$ may be obtained by selecting a gas that contributes to molecular rotations and/or vibrations to the overall $\chi^{(3)}$, such as Nitrogen for example, in a delayed Raman response responsible for the asymmetric broadening towards lower frequencies (longer wavelengths) [23]. As discussed hereinbelow, asymmetric broadening may be used to more efficiently direct the spectral broadening towards the infrared-region for example.

Higher order nonlinear phenomena such as self-steepening and gas ionization may also lead to asymmetric pulse spectral broadenings. As long as well-defined lobes with (almost) linear spectral phase can be identified and filtered, transform-limited pulses can be successfully generated.

The pulse duration of the spectrally filtered output pulse may be the same as the input pulse duration, or shorter or longer.

Figure 1E:
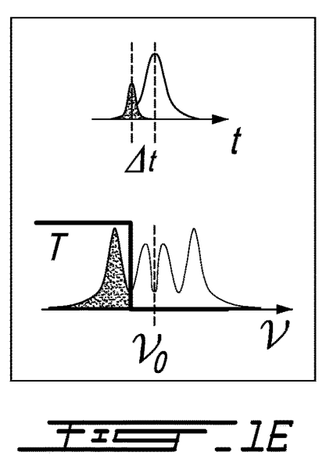

The broadened spectrum is filtered (see filter (F) FIG. 1B) to select at least one well-shaped external lobes thereof. Since the spectral phase, induced by self-phase modulation (SPM) in case of symmetric broadening or Raman in case of asymmetric broadening as discussed hereinabove for example, across such lobes is almost linear, the filtering directly yields a transform-limited pulse (Output) delayed in time by Δt with respect to, and shorter than, the original laser pulse (Gpump) (FIG. 1E—lower panel).

Figure 2:
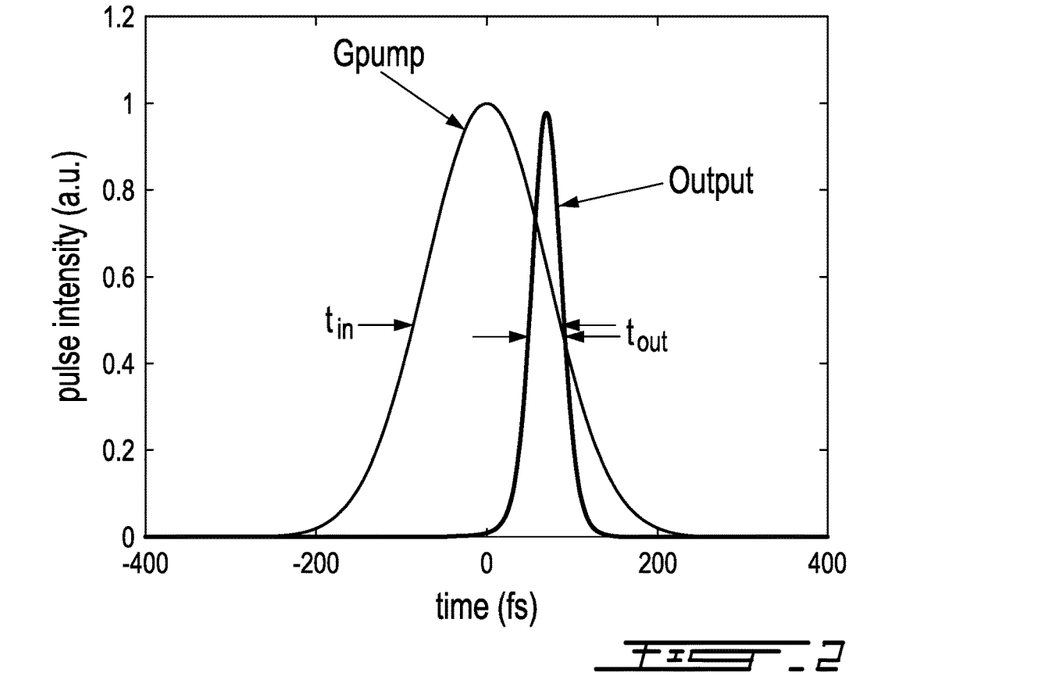
FIG. 2 shows input Gaussian pump pulse of $t_{in}$=170 fs full-width at half maximum (FWHM) and output pulse resulting by selecting only the external lobe (filled area in FIG. 3) of self-phase modulation (SPM) according to an embodiment of an aspect of the present disclosure.
Figure 3:
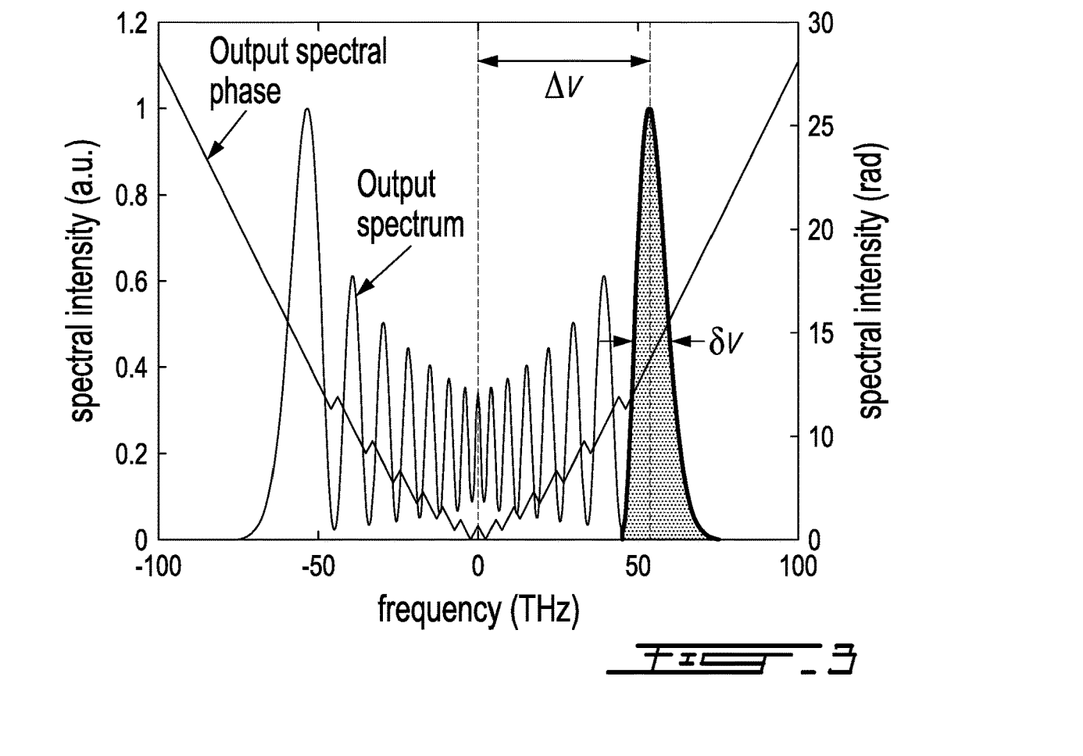
FIG. 3 shows an output spectrum and spectral phase due to self-phase modulation (SPM) of the input Gaussian pump of FIG. 2, the filled area representing the filtered portion of the spectrum.

FIGS. 2 and 3 show simulations, for an input Gaussian pulse (Gpump) of $t_{in}$=170 fs duration full-width-at-half-maximum (FWHM) experiencing self-phase modulation (SPM) along propagation, output spectrum and related spectral phase shown in FIG. 3. An external lobe selected by spectral filtering corresponds in time to a transform-limited pulse $t_{out}$ (Output in FIG. 2) about 4 times shorter than the original one $t_{in}$ (Gpump in FIG. 2).

Spectral filtering can be achieved with a transmission filter or with a reflective filter. The spectral filtering can be achieved with a frequency selective unit consisting of prisms, gratings, grisms or any combination thereof. One exemplary frequency selective unit could be a 4-f stretcher/compressor setup.

Figure 4:
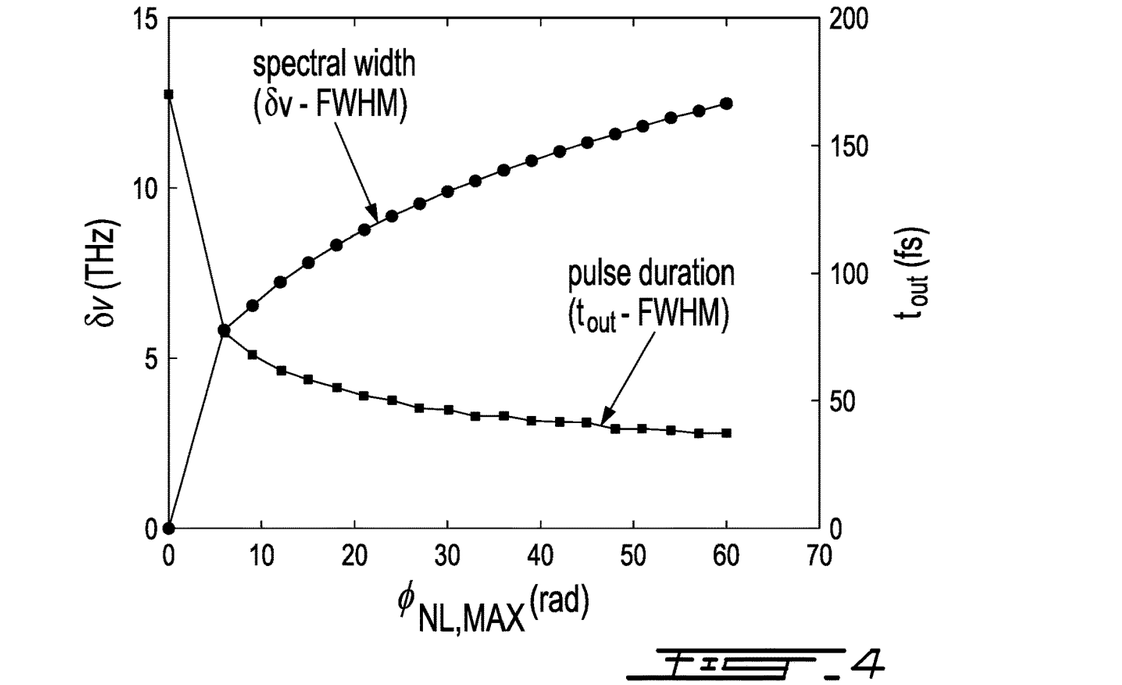
FIG. 4 shows the spectral width $\delta_{v-}$ FWHM of the filtered external lobe (filled area in FIG. 3); and the corresponding pulse duration $t_{out}$ (FWHM) as a function of the maximum nonlinear phase shift $\phi_{NL,MAX}$ induced by self-phase modulation (SPM)
Figure 5:
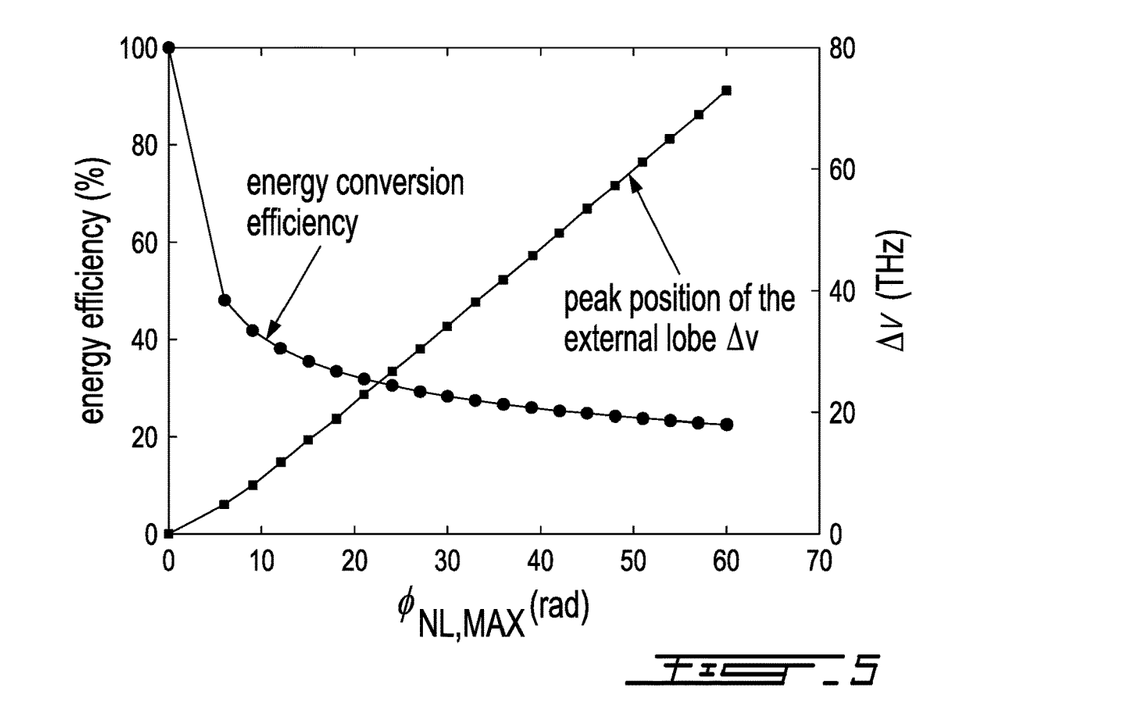
FIG. 5 shows energy conversion efficiency; and frequency position of the external lobe with respect to the central frequency ($\Delta v$) as a function of the maximum nonlinear phase shift $\phi_{NL,MAX}$ induced by self-phase modulation (SPM)

Numerical results illustrated in FIGS. 4 and 5 show how this mechanism scales as a function of the spectral broadening, proportional to the maximum nonlinear phase $\phi_{NL,MAX}$ accumulated via self-phase modulation (SPM). In particular, FIG. 4 shows the trends of the pulse duration ($t_{out}$–FWHM) and spectral width (δv–FWHM) corresponding to the selected lobe as a function of the maximum nonlinear phase $\phi_{NL,MAX}$ accumulated via self-phase modulation (SPM). The pulse duration ($t_{out}$–FWHM) decreases while the spectral width (δv–FWHM) increases, thus keeping the time-bandwidth product almost constant at the transform-limit of about 0.44 for a Gaussian pulse. In other words, the pulses generated by the method have their minimum possible duration and no further manipulation is required.

FIG. 5 shows the energy conversion efficiency of the filtering process, defined as the energy located within the external lobe with respect to the total output energy, and the peak position in frequency of the external lobe Δv as a function of the maximum nonlinear phase shift $\phi_{NL,MAX}$ induced by SPM. As shown, the energy conversion efficiency decreases with $\phi_{NL,MAX}$. However, even for a large broadening, energy conversion reaches about 15%. The position of the lobe, which represents the frequency tunability of the system, scales linearly with the maximum nonlinear phase $\phi_{NL,MAX}$.

As people in the art will now be in a position to appreciate, ultrashort pulses can be generated in any part of the spectrum with durations shorter than durations of the input pulses, as long as enough maximum nonlinear phase $\phi_{NL,MAX}$ is provided. This can be achieved by varying the gas pressure, which changes almost linearly the value of the $\chi^{(3)}$ nonlinearity and therefore the amount of spectral broadening. Moreover, according to the input pulse peak intensity, different gases may be selected to provide the required value of the $\chi^{(3)}$.

Hollow-core-fibers (HCFs) are adjustable nonlinear media, as their lengths and diameters can be selected to match the specific requirements of the laser system employed. Other nonlinear media such as glasses and crystals may also be used.

Figure 6:
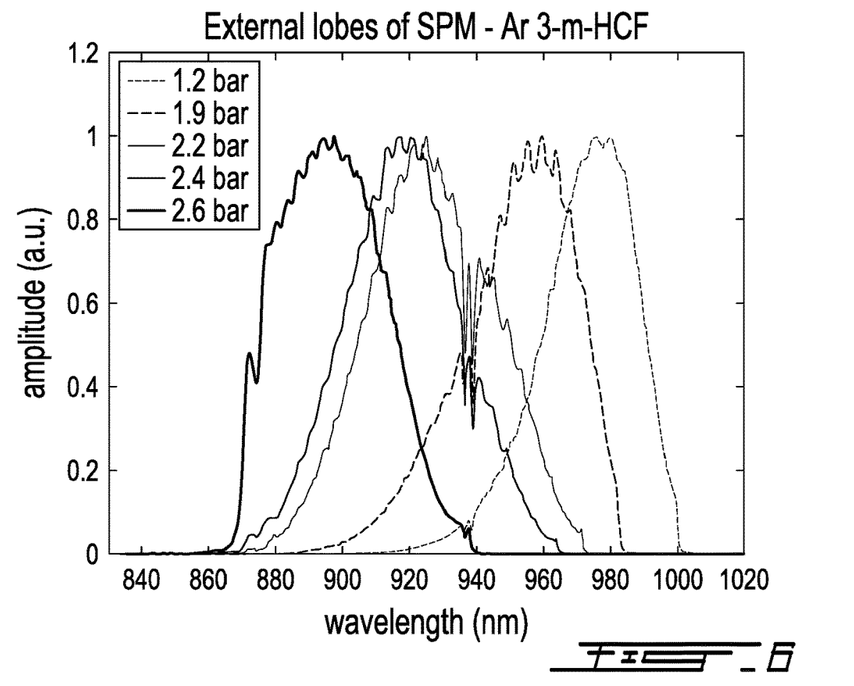
FIG. 6 shows experimentally filtered external lobes induced by self-phase modulation (SPM) when a 1 mJ, 170 fs pulses at 1030 nm propagates along a 3-m-long Argon-filled hollow-core-fiber (HCF), at five different pressure levels.
Figure 7:
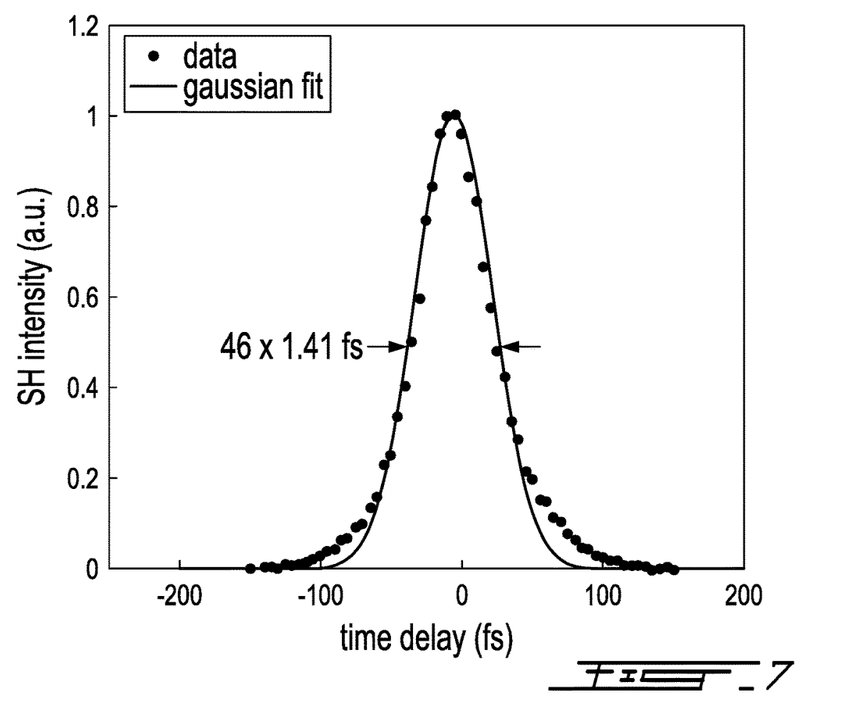
FIG. 7 shows autocorrelation trace corresponding to the spectrum at 2.2 bar pressure in FIG. 6, the trace corresponding to a pulse of 46 fs, considering the deconvolution factor of 1.41 for a Gaussian pulse.

In an experiment, a commercially available Yb:KGW laser emitting 1 mJ, 170-fs-long pulses centered at 1030 nm was used. The laser pulses were focused into a 3-m-long Argon-filled hollow-core-fiber (HCF) of 500 μm inner diameter. FIG. 6 shows the external lobes of the SPM for different Argon pressure levels between 1.2 bar and 2.6 bar, as selected by filtering. As it is possible to see from the autocorrelation trace, used to measure the pulse duration, in FIG. 7, the spectrum in FIG. 6 of the selected external lobe of SPM at 2.2 bar pressure corresponds in time to a pulse of about 46 fs in time. The other spectra, corresponding to different broadenings obtained by varying the gas pressure, led to very similar pulse durations (not shown here for clarity). This experiment proves that the method and system allow generating ultrashort pulses tunable in a broad range of frequencies, thus effectively covering the 0.8 μm-1.1 μm "gap" of optical parametric amplification (OPA) systems pumped by Ti:sapphire lasers discussed hereinabove.

Figure 8:
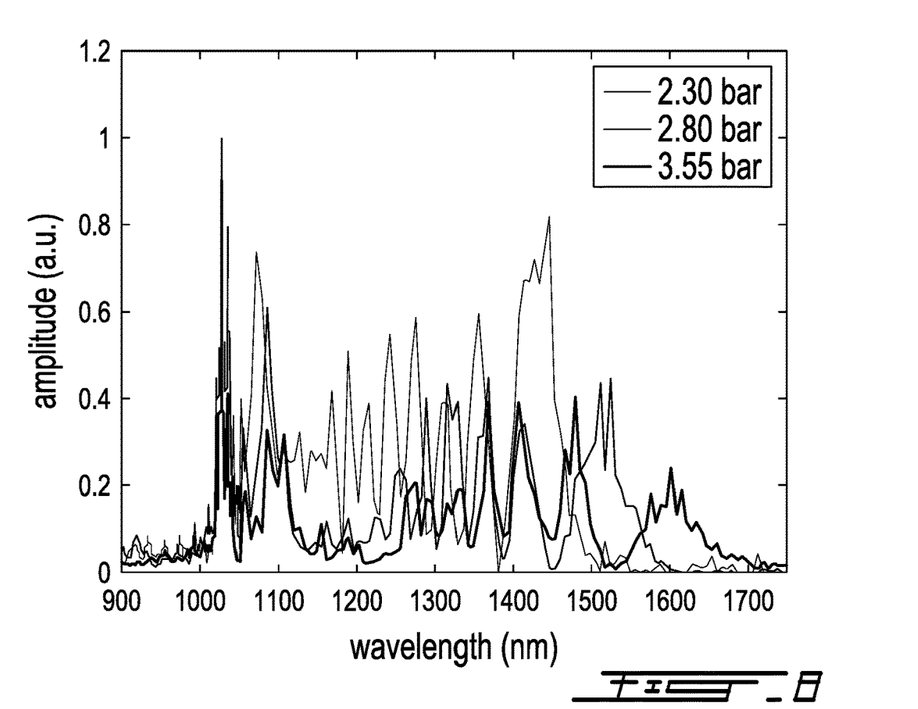
FIG. 8 shows spectral broadening in a 6-m-long Nitrogen-filled hollow-core-fiber (HCF) at three different pressure levels.
Figure 9:
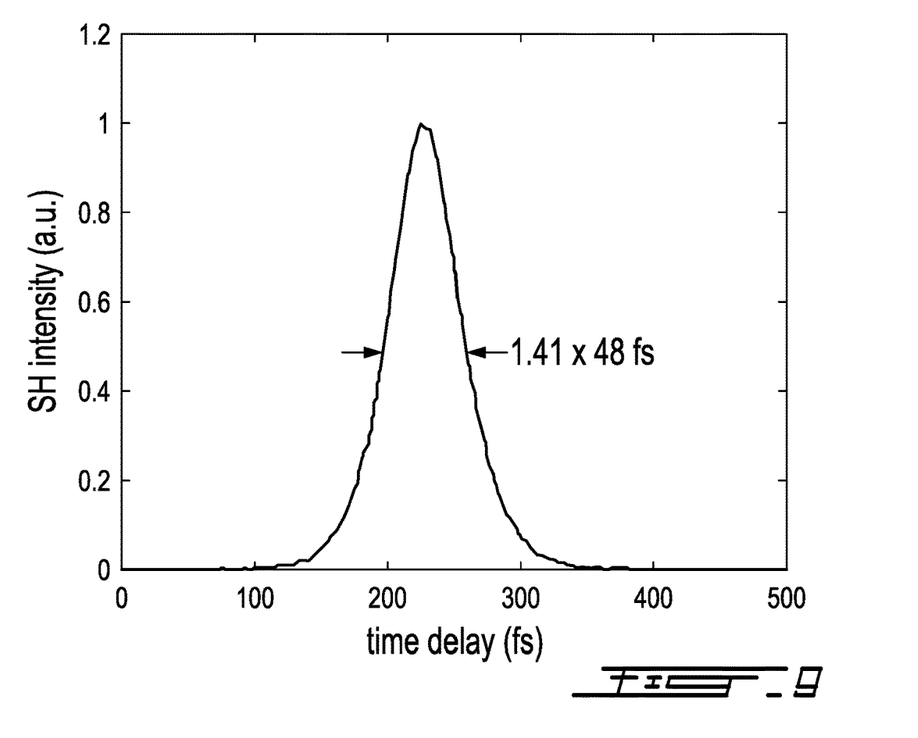
FIG. 9 shows autocorrelation trace corresponding to the filtered external lobe of the spectrum at 2.80 bar shown in FIG. 8, corresponding to a pulse of 48 fs, considering a deconvolution factor of 1.41 for a Gaussian pulse.

As previously mentioned, the gas may be selected so as to induce an asymmetric broadening. An experiment was performed by filling a 6-m-long hollow-core-fiber (HCF) with Nitrogen gas instead of Argon. FIG. 8 shows three output spectra recorded at three different pressures: 2.30, 2.80, and 3.55 bar. The Raman response of the gas induces an asymmetrically broadening of the pulse spectrum towards the near-infrared region, around 1500 nm starting from 1030 nm. The external lobe selected at 1500 nm of the spectrum in FIG. 8 at 2.80 bar directly corresponds to a 48 fs pulse in time (see autocorrelation trace in FIG. 9). Considering the loss of the hollow-core-fiber (HCF) and of the input and output windows, as well as the transmission of the filter used to select the external lobe, about 10% overall energy conversion efficiency was achieved, thus demonstrating that high-energy sub-100 fs pulses can be generated in the near-infrared, which is a region of interest for telecom, using commonly available Yb lasers.

A commercial Yb laser was used in the experiments. However, the system and the method described can be applied, in principle, to any laser source at any emission wavelength.

There is thus presented a method and a system for high-power ultrafast and tunable optical pulse generation in the region between about 800 nm and about 1700 nm, for input pump pulses centered at about 1030 nm. The visible part of the spectrum can also be explored by using pump pulses at the double frequency, i.e. at 515 nm via second-harmonic generation. Other harmonics of the laser fundamental frequency can be also used. Different laser sources maybe also used to cover other frequency ranges.

By filtering external lobes of a spectrally broadened laser pulse, short pulses, continuously tunable from the UV to the near-infrared regions may be delivered, overcoming a number of drawbacks and limitations set by typical optical parametric amplification (OPA) and optical parametric chirped-pulse amplification (OPCPA) systems.

The method and system may be extended in the mid-infrared and THz spectral domain as will now be discussed.

A mid-infrared system according to an aspect of the present disclosure comprises at least one pair of gratings (G), which compensates the nonlinear phase of the output spectrum introduced during the spectral broadening, in such a way that all wavelengths in the output spectrum arrive at the same time. The gratings are selected with between 100 and 2000 lines/mm. They may be transmission gratings, reflective gratings, ruled reflective gratings, or reflective holographic. Alternatively, they may be prisms, grisms, 4-f stretcher/compressor setups or dispersive fibers.

In addition, the wavelengths in the spectrum are spread in the space and therefore are readily accessible for filtering. The filter unit comprises a spatial filter (SF), so as to selectively block/transmit two lobes of the output spectrum, which correspond to two pulses at two different wavelengths. The spatial filter (SF) may be an opaque material, i.e. which selectively blocks/transmits in space the various spectral (frequency) components. The two pulses are directed to a nonlinear non-centrosymmetric crystal (NC) of second-order nonlinear susceptibility $\chi^{(2)}$, for difference-frequency generation (DFG) between the two pulses, yielding a third pulse at a frequency which is the difference between the first two pulses. If the first two pulses are located in the near-IR region, as they typically are, the third pulse falls in the mid-infrared. The nonlinear non-centrosymmetric crystal (NC) is in a material having high second-order nonlinear susceptibility, typically $\chi^{(2)}>10^{-12}$ m/V, and low chromatic dispersion and transparency in the required frequency range. The nonlinear non-centrosymmetric crystal (NC) may be Lithium triborate (LiB$_3$O$_5$), beta barium borate (BaB$_2$O$_4$), lithium niobate (LiNbO$_3$), zinc selenide (ZnSe), zinc sulfide (ZnS), cadium selenide (CdSe), gallium selenide (GaSe), or silver gallium selenide (AgGaSe$_2$), for example.

Figure 10A:
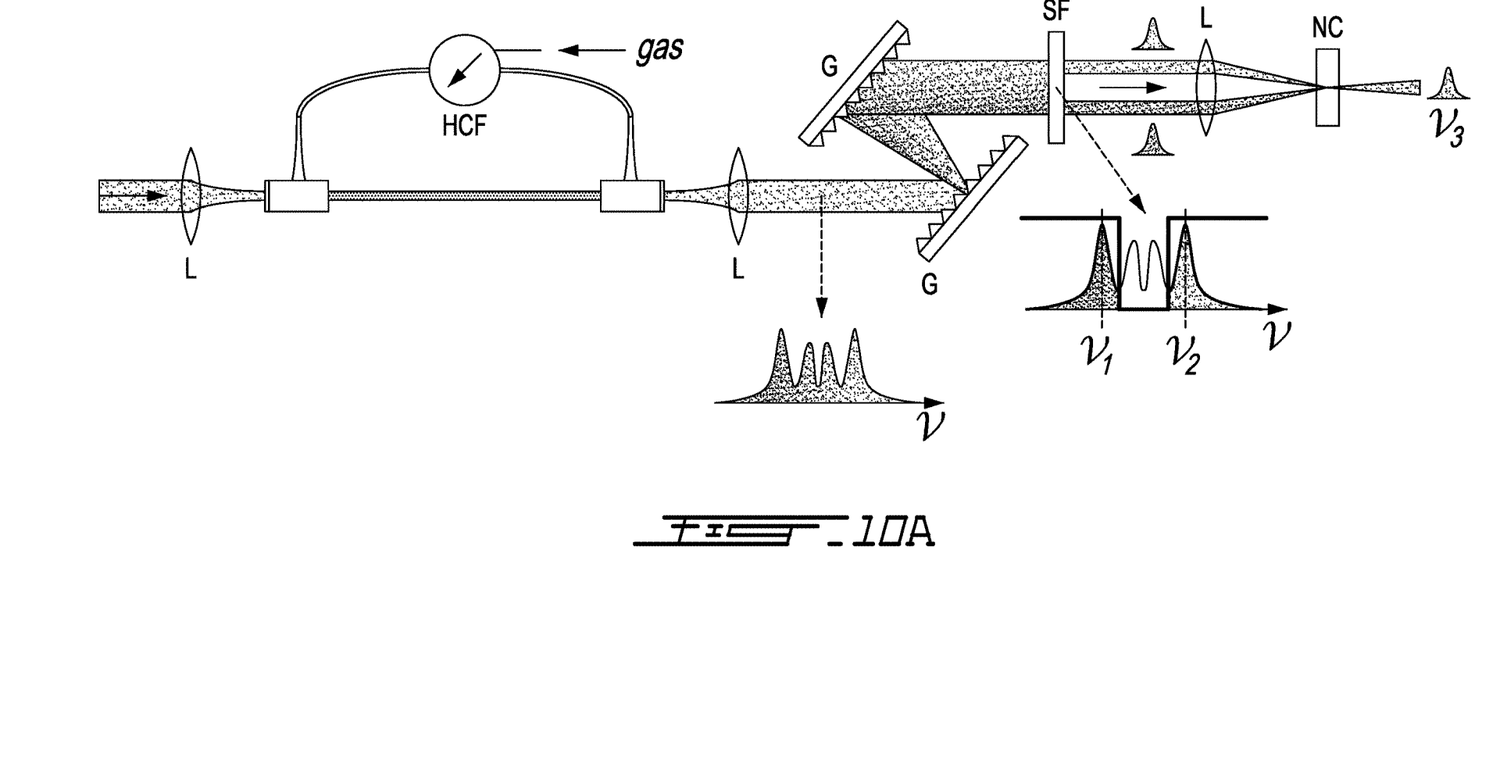
FIG. 10A is a schematic of a system with non-collinear geometry for pulse generation in the mid-infrared region according to an embodiment of an aspect of the present disclosure.
Figure 10B:
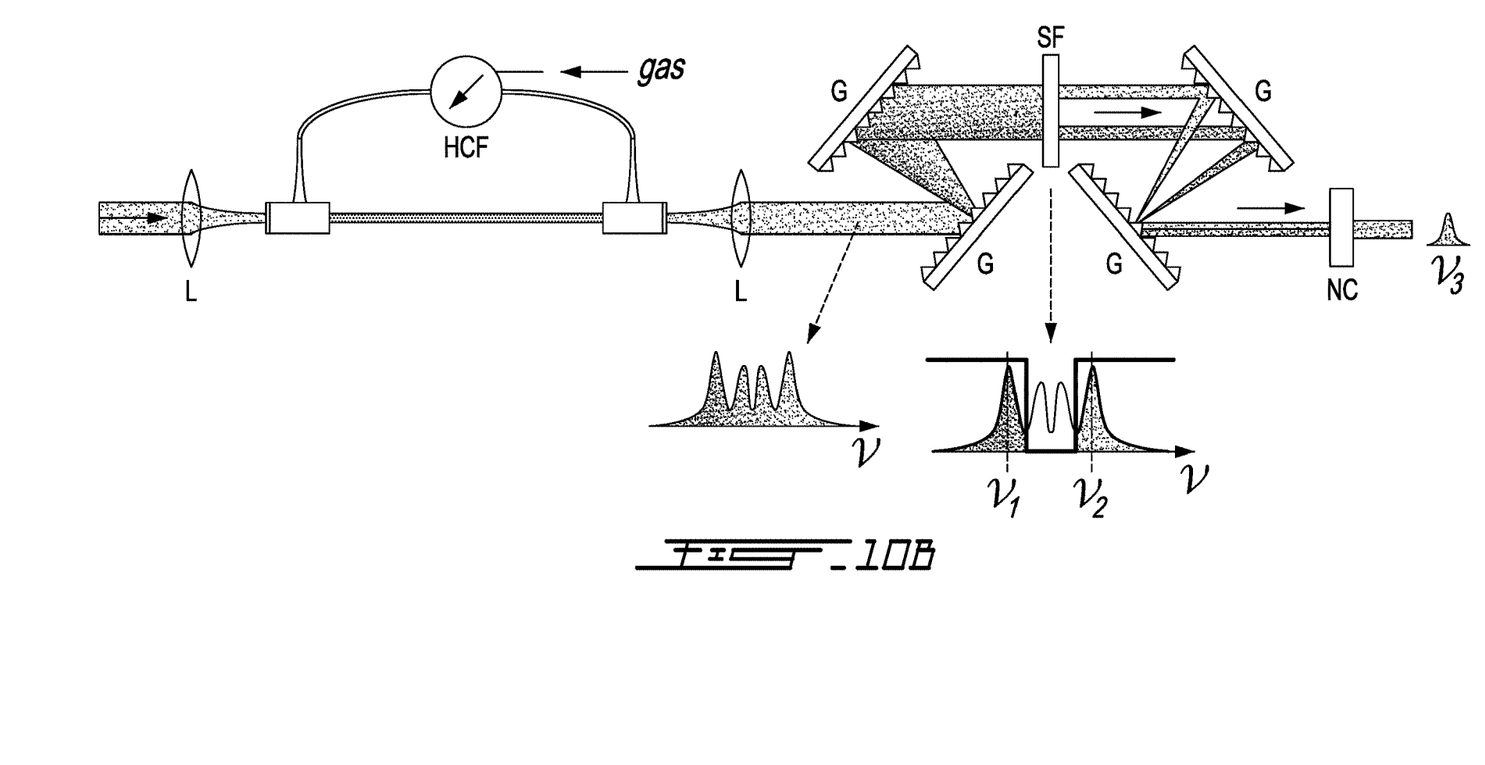
FIG. 10B is a schematic of a system with collinear geometry for pulse generation in the mid-infrared region according to an embodiment of an aspect of the present disclosure.

FIG. 10 show such systems to reach the mid-infrared region by selecting two lobes of a SPM-broadened pulse and further mixing them together via difference frequency generation (DFG) in a $\chi^{(2)}$ crystal (NC), either in a non-collinear (FIG. 10A) or in a collinear geometry (FIG. 10B). The pulse broadened along propagation through the HCF fiber is first collimated and then sent through a pair of gratings (G). As mentioned hereinabove, grating pairs are employed to cancel out the relative temporal delay between the two pulses associated with the two lobes (see FIG. 1 lower panel and FIG. 2), or "colors", introduced by the broadening process in the hollow-core-fiber (HCF). Then, a spatial filter (SF) selects the two external lobes at frequencies $v_1$ and $v_2$. Finally, the two pulses, corresponding to the two selected lobes, are sent into a nonlinear crystal (NC) to generate via difference-frequency generation (DFG) an output pulse at frequency $v_3=v_2-v_1$. In this way, a wide and continuous tunability in the mid-infrared is achieved.

Thus, the present method and system may be used to extend the tuning range of Ti:sapphire and Yb laser sources, as well as other laser sources, in the mid-infrared.

Figure 11A:
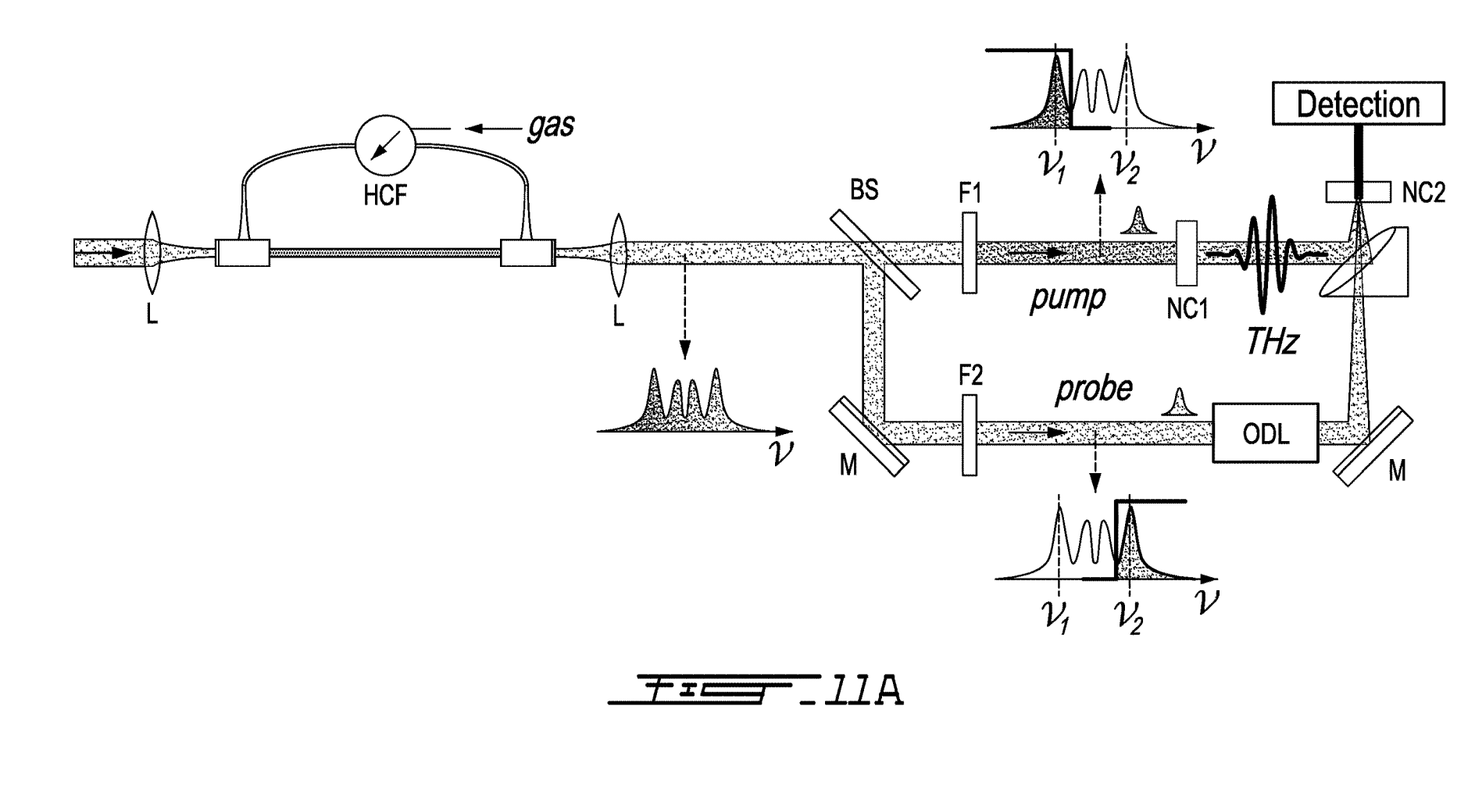
FIG. 11A is a schematic of a system for broadband THz generation and detection according to an embodiment of an aspect of the present disclosure.

Selecting two lobes of a SPM-broadened pulse may also be used to generate THz, with a system as illustrated for example in FIG. 11A. As illustrated, the pulse corresponding to the lobe at longer wavelengths is used to efficiently generate ultrashort THz pulses, while the lobe at a shorter wavelength is used for the detection of the THz pulse waveform via electro-optic sampling (EOS). In FIG. 11A, the output of a hollow-core-fiber (HCF) is first split into two beams by a beam splitter (BS). A pump filter (F1) selects a first lobe of the spectrum as a pump pulse, while a probe filter (F2) selects a second lobe as a probe pulse. The pump pulse, at a longer wavelength, is used to excite a first nonlinear crystal NC1 to generate an ultrashort THz pulse via optical rectification, while the probe pulse, at a shorter wavelength, is used to perform the detection of the THz pulse via electro-optic sampling (EOS) in a second nonlinear crystal NC2. The THz pulse is reconstructed in time by varying the relative delay between the THz pulse generated by the pump pulse in the first nonlinear crystal NC1 and the probe pulse by means of an optical delay line (ODL). For each relative delay, the polarization state of the probe pulse is measured at the detection stage, the change in the polarization state of the probe pulse after passing through the nonlinear crystal NC2 being proportional to the strength of the incident THz electric field.

Figure 11B:
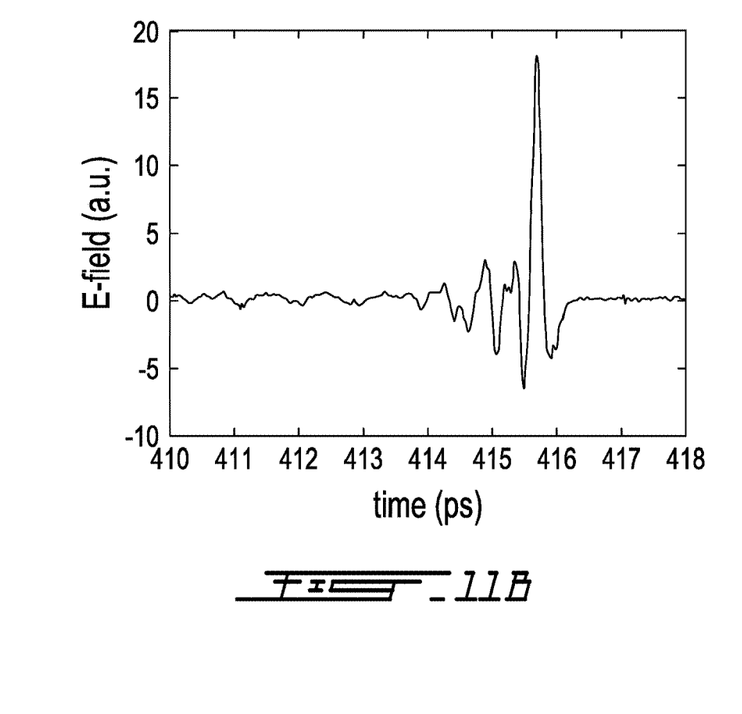
FIG. 11B shows THz pulse waveform retrieved via electro-optic sampling (EOS)
Figure 11C:
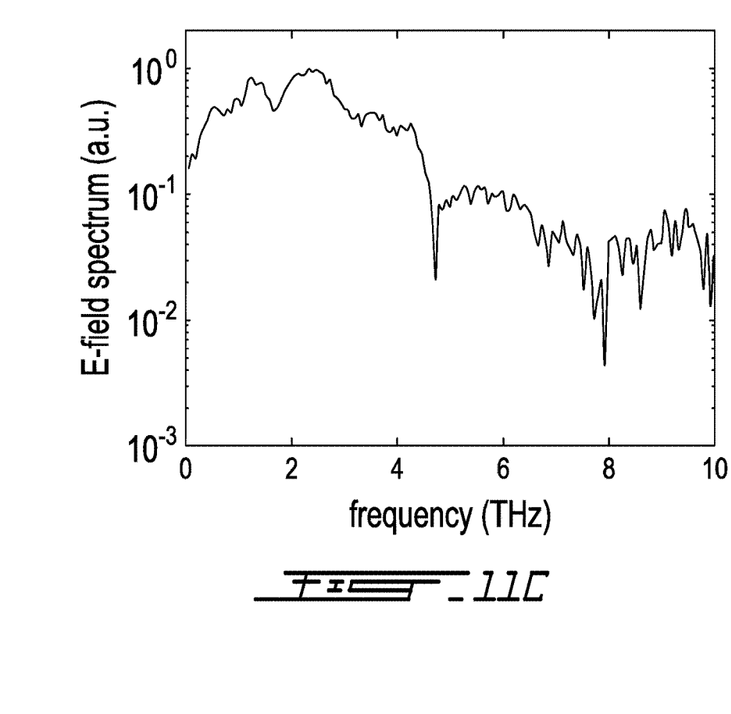
FIG. 11C shows corresponding spectrum obtained via Fourier-transform of the time trace in FIG. 11B.

This was experimentally verified by employing the same setup used to obtain the results shown in FIG. 8. The pulse corresponding to the lobe at 900 nm was used to perform electro-optic sampling (EOS) of the THz pulses generated from an organic crystal pumping with the pulse associate with the lobe at 1500 nm. The results are shown in FIGS. 11B and 11C. FIG. 11B shows the electric field waveform of the THz pulses detected in the second nonlinear crystal NC2 via electro-optic sampling (EOS) by varying the relative delay between pump and probe pulses. FIG. 11C shows the THz spectrum associate with the THz pulses, obtained via Fourier-transform of the corresponding THz waveforms in FIG. 11B.

Thus, the present method and system may be used to extend the tuning range of Ti:sapphire and Yb laser sources, as well as other laser sources, in THz region. A system according to an embodiment of an aspect of the present disclosure in the THz regions comprises a beam splitter (BS) to split the output laser beam in a pump and a probe beams. On the pump beam, a portion of the output spectrum is selected as a pump pulse to generate a THz pulse. On the probe beam, a portion of the spectrum is selected as a probe pulse to sample the generated THz pulse. A first nonlinear crystal (NC1) generates THz pulses radiation from the pump pulse, and a second nonlinear crystal (NC2) is used for electro-optic sampling of the generated THz pulse. An optical delay line (ODL) is used to vary the temporal delay between the THz pulse and the probe pulse, for reconstruction of the THz pulse in time. The change in polarization state of the probe beam is detected.

The beam splitter (BS), with a splitting ratio 95%/5% in the example, may be any material transparent to the desired wavelength. Different splitting ratios maybe used.

The pump and probe filters (F1, F2) are long-pass edge filters, short-pass edge filters, or band-pass filters. The edge should be steep enough to select a specific portion, or a lobe. The filters are selected with negligible chromatic dispersion in the operating band. They may be dielectric filters or colored glass filters Alternatively, they may be optical filters comprising diffraction gratings, prisms, grisms, Fabry-Perot interferometer, optical resonators, for example.

The nonlinear crystal (NC1) is selected for generation of THz pulses radiation from the pump pulse. A material with high second-order nonlinear susceptibility, typically $\chi^{(2)}>10^{-12}$ m/V, low chromatic dispersion and transparency in the required frequency range, is selected. It may be zinc telluride (ZnTe), gallium phosphide (GaP), organic crystals (HMQ-TMS, DAST); any non-centrosymmetric materials with a second-order nonlinear susceptibility $\chi^{(2)}>10^{-12}$ m/V may be used.

The nonlinear crystal (NC2) is selected to perform electro-optic sampling (EOS) of the generated THz pulse, with a high electro-optic coefficient, typically of more than $10^{-12}$ m/V, low chromatic dispersion and transparency in the required frequency range is selected. It may be zinc telluride (ZnTe), gallium phosphide (GaP); any non-centrosymmetric materials a second-order nonlinear susceptibility $\chi^{(2)}>10^{-12}$ m/V may be used.

The optical delay line (ODL) is selected with a capability of scanning>1 mm with sub-ps resolution. The optical delay line (ODL) may be a motorized linear optical delay line, or one of: all-optical delay lines, integrated delay lines and rotary delay lines, for example.

The detection stage is selected with a capability of resolving phase-shift between the two orthogonal polarization state of the probe of about $10^{-3}$ rad. The detection stage may comprise a combination of a quarter-wave plate, a Wollastone prism and a balanced photodetector. Alternatively, polarimeters, or metamaterial-based device for polarization measurement may be used.

A method according to an aspect of the present disclosure thus comprises adjusting a laser input beam size, spectral broadening of the laser input beam and filtering the output spectrum (wavelength/frequency domain) to select at least one portion of the laser output spectrum.

Adjusting the laser input beam size into a free-space nonlinear medium or at the input of a nonlinear waveguide is performed by reducing or increasing the beam size in such a way to increase or reduce the optical intensity in the nonlinear medium and in the mode-matching with the waveguide in case a waveguide is used.

During propagation into the nonlinear medium the pulse spectrum is broadened towards shorter wavelengths, longer wavelengths, or both, depending on the nonlinearity of the nonlinear medium and on the waveguide properties in case a waveguide is used. For example, in an Argon-filled hollow-core-fiber (HCF) the pulse spectrum is symmetrically broadened around the central laser wavelength via self-phase modulation (SPM), while in a Nitrogen-filled hollow-core-fiber (HCF) the pulse spectrum results mostly broadened towards longer wavelengths via Raman. The amount of broadening can be tuned by selecting a specific nonlinear medium, varying the pulse intensity in the nonlinear medium or by adjusting the gas pressure within a hollow-core-fiber (HCF) for example. Adjusting the gas pressure within a hollow-core-fiber (HCF) allows a wide range of wavelengths due to the intrinsic transparency as well as low dispersion of most gases.

Filtering a lobe of the broadened output spectrum readily results in a quasi-transform-limited output pulse shorter than the input pulse, with good conversion efficiency, and centered at a different wavelength. Depending on the amount and type of spectral broadening, pulses tunable in a wide range of frequencies can be thus obtained.

For extension in the mid-infrared, the method comprises first temporal compensation and spatial spread of the spectral components of the broadened laser output spectrum. A gratings pair may be employed to compensate the arrival time, as well as to spread in space the wavelengths/frequencies contained in the broadened output spectrum, so that the wavelengths/frequencies contained in the output spectrum arrive at the same time while they are separated in space.

Then two lobes of the output spectrum are selected, in the space domain by spatial filtering, thus corresponding to two different pulses at two different wavelengths/frequencies that arrive at the same time.

The two pulses are then nonlinearly mixed together in a second-order (non-centrosymmetric) nonlinear crystal resulting in the generation of a third pulse centered at a frequency which is the difference between the first two pulses. Depending on the amount and type of spectral broadening, as well as on the selected lobes in the output spectrum, pulses tunable in the mid-infrared are thus obtained.

For spectral extension in the THz domain, the method comprises first dividing the output beam into a pump and a probe lines for THz generation and detection, respectively. A lobe of the pump output is spectrally selected for THz generation. A lobe of the probe output spectrum is spectrally selected to perform electro-optic sampling (EOS) of the generated THz pulse. The pump pulse is sent on a first second-order nonlinear susceptibility nonlinear crystal for THz radiation generation via optical rectification. The probe pulse is sent on a second second-order nonlinear susceptibility nonlinear crystal for THz pulse reconstruction in time via electro-optic sampling.

Wide tuning ranges from UV to near-infrared are possible by varying the gas pressure and/or gas nature, thereby bridging the "gap" in the tuning range as the result of phase-matching conditions or transparency of the crystal employed in optical parametric amplification (OPA) systems.

No temporal matching between two interacting pulses, pump and signal/idler, is required. Indeed, the generation of a pulse with a new frequency happens inside of the pump pulse itself.

The very low-dispersion of gases allows to achieve well-behaved spectral broadenings, which in turn directly leads to well-shaped transform-limited output pulses.

Considering the intrinsic linear transmission of the hollow-core-fiber (HCF), overall energy conversion efficiencies in the range between about 10% and 20% can be achieved, which is in line with the typical efficiency of optical parametric amplification (OPA) systems.

Pulse propagation through hollow-core-fiber (HCF)s allows a perfect beam quality of the output pulses.

The use of hollow-core-fiber (HCF) allows scaling the system in terms of average and peak powers, potentially allowing to handle extremely high, or low, intensities. Moreover, the system can be tailored to the specific requirements of the laser system employed.

Instead of a hollow-core-fiber (HCF) a multi-pass configuration described in example hereinabove may be employed.

The present systems are cost-effective, at least one order of magnitude less expensive than optical parametric amplification (OPA) systems for instance. In particular, since no complex pumping laser system, nor complex optical parametric amplification (OPA) configuration, is required.

The present system and method may be implemented to extend operation in the mid-infrared and THz regions.

The present system and method allow to generate continuously-tunable ultrashort pulses in a cost-effective way, spanning from the UV to the near-infrared region.

The scope of the claims should not be limited by the embodiments set forth in the examples, but should be given the broadest interpretation consistent with the description as a whole.

REFERENCES

[1] A. M. Weiner, "Ultrafast Optics" in *Wiley Series in Pure and Applied Optics* (John Wiley & Sons, Inc., Hoboken, N.J., 2009).

[2] J. Pouysegur et al., "Generation of 150-fs pulses from a diode-pumped Yb:KYW nonlinear regenerative amplifier," Optics Express 22, 9414 (2014).

[3] M. Clerici et al., "Wavelength scaling of terahertz generation by gas ionization," Physical Review Letters 110, 253901 (2013).

[4] C. Vicario et al., "Intense, carrier frequency and bandwidth tunable quasi single-cycle pulses from an organic emitter covering the Terahertz frequency gap," Scientific Reports 5, 14394 (2015).

[5] P. B. Corkum et al., "Attosecond science," Nature Physics 3, 381 (2007).

[6] M. G. Pullen et al., "Imaging an aligned polyatomic molecule with laser-induced electron diffraction," Nature Communications 6, 7262 (2015).
[7] A. H. Zewail, "Femtochemistry: Atomic-Scale Dynamics of the Chemical Bond," The Journal of Physical Chemistry A 104, 5660 (2000).
[8] R. Ackermann et al., "Femtosecond laser treatment of the crystalline lens: a 1-year study of possible cataractogenesis in minipigs," Graefe's Archive for Clinical and Experimental Ophthalmology 249, 1567 (2011).
[9] K. Sugioka et al., "Ultrafast lasers—reliable tools for advanced materials processing," Light: Science & Applications 3, e149 (2014).
[10] C. Manzoni et al., "Design criteria for ultrafast optical parametric amplifiers," Journal of Optics 18, 103501 (2016).
[11] A. Ciriolo et al., "Optical Parametric Amplification Techniques for the Generation of High-Energy Few-Optical-Cycles IR Pulses for Strong Field Applications," Applied Sciences 7, 265 (2017).
[12] D. Brida et al., "Few-optical-cycle pulses tunable from the visible to the mid-infrared by optical parametric amplifiers," Journal of Optics 12, 013001 (2010).
[13] E. J. Takahashi et al., "10 mJ class femtosecond optical parametric amplifier for generating soft x-ray harmonics," Applied Physics Letters 93, 041111 (2008).
[14] N. Thiré et al., "10 mJ 5-cycle pulses at 1.8 μm through optical parametric amplification," Applied Physics Letters 106, 091110 (2015).
[15] A. Dubietis et al., "Powerful femtosecond pulse generation by chirped and stretched pulse parametric amplification in BBO crystal," Optics Communications 88, 437 (1992).
[16] C. Vozzi et al., "Millijoule-level phase-stabilized few-optical-cycle infrared parametric source," Optics Letters 32, 2957 (2007).
[17] N. Ishii et al., "Sub-two-cycle, carrier-envelope phase-stable, intense optical pulses at 1.6 μm from a $BiB_3O_6$ optical parametric chirped-pulse amplifier," Optics Letters 37, 4182 (2012).
[18] Y. Fu et al., "High-energy infrared femtosecond pulses generated by dual-chirped optical parametric amplification," Optics Letters 40, 5082 (2015).
[19] B. E. Schmidt et al., "Frequency domain optical parametric amplification," Nature Communications 5, 3643 (2014).
[20] V. Gruson et al., "2.5 TW, two-cycle IR laser pulses via frequency domain optical parametric amplification," Optics Express 25, 27706 (2017).
[21] M. Nisoli et al., "Generation of high energy 10 fs pulses by a new pulse compression technique," Applied Physics Letters 68, 2793 (1996).
[22] Y.-G. Jeong et al., "Direct compression of 170-fs 50-cycle pulses down to 1.5 cycles with 70% transmission," Scientific Reports 8, 11794 (2018).
[23] G. P. Agrawal, "Nonlinear Fiber Optics" (Academic Press, Waltham, Mass., 2013).

The invention claimed is:

1. A system for generating tunable ultrafast optical pulses, comprising a laser source, a gas-filled hollow-core fiber selected for spectrally broadening an input laser pulse by self-phase modulation or Raman effect and a filter unit, wherein an input pulse is spectrally broadened by propagation within said gas-filled hollow-core fiber, and said filter unit selects at least a spectral lobe of a broadened pulse output spectrum, yielding an output pulse shorter than the input pulse and centered at a different frequency.

2. The system of claim 1, wherein said input pulse has a pulse energy of at least 1 nJ and pulse duration at most 1 ns, said gas-filled hollow-core fiber is filled with a gas of a third-order nonlinear susceptibility $\chi^{(3)} > 10^{-27}$ m$^2$/V$^2$.

3. The system of claim 1, comprising an optical unit adjusting a size of a beam from the laser source to a matching optical intensity in the gas-filled hollow-core fiber.

4. The system of claim 1, wherein the gas-filled hollow-core fiber is filled with a gas of a third-order nonlinear susceptibility $\chi^{(3)}$ larger than $10^{27}$ m$^2$/V$^2$.

5. The system of claim 1, wherein said gas-filled hollow-core fiber guides the input pulse over a selected distance at least once.

6. The system of claim 1, said system comprising an optical unit adjusting the beam from the laser source to a matching main mode of the gas-filled hollow-core fiber.

7. The system of claim 1, wherein said gas-filled hollow-core fiber is filled with one of: Argon, Nitrogen, Helium, Krypton, Xenon, and carbon dioxide.

8. The system of claim 1, wherein said gas-filled hollow-core fiber is filled with a molecular Raman-active gas.

9. The system of claim 1, wherein the laser source is selected with a laser input energy of at least 1 micro joule and pulse duration of at most 10 picoseconds.

10. The system of claim 1, wherein at least one of i) a length and ii) a diameter of the gas-filled hollow core fiber is selected according to the laser source.

* * * * *